(12) United States Patent
    Manesh

(10) Patent No.: US 9,117,126 B2
(45) Date of Patent: Aug. 25, 2015

(54) TAMPER RESISTANT 3D MAGNETIC STRIPE READER INTEGRATED CIRCUIT

(71) Applicant: MagTek, Inc., Seal Beach, CA (US)

(72) Inventor: Hamid Manesh, Irvine, CA (US)

(73) Assignee: MagTek, Inc., Seal Beach, CA (US)

( * ) Notice: Subject to any disclaimer, the term of this patent is extended or adjusted under 35 U.S.C. 154(b) by 0 days.

(21) Appl. No.: 14/207,315

(22) Filed: Mar. 12, 2014

(65) Prior Publication Data

US 2014/0263646 A1   Sep. 18, 2014

Related U.S. Application Data

(60) Provisional application No. 61/780,909, filed on Mar. 13, 2013.

(51) Int. Cl.
    *G06K 7/02*    (2006.01)
    *G06K 7/08*    (2006.01)

(52) U.S. Cl.
    CPC ..................................... *G06K 7/084* (2013.01)

(58) Field of Classification Search
    CPC ....... G06K 7/084; G06K 7/082; G06K 7/087; G06K 1/125
    USPC ................................................. 235/439, 449
    See application file for complete search history.

(56) References Cited

U.S. PATENT DOCUMENTS

| | | |
|---|---|---|
| 5,369,299 A | 11/1994 | Byrne et al. |
| 7,210,627 B2 | 5/2007 | Morley, Jr. et al. |
| 7,377,433 B2 | 5/2008 | Morley, Jr. et al. |
| 7,478,751 B2 | 1/2009 | Morley, Jr. et al. |
| 7,772,661 B2 | 8/2010 | Kilian et al. |
| 2008/0017712 A1* | 1/2008 | Hart et al. ..................... 235/449 |
| 2009/0152356 A1 | 6/2009 | Reddy et al. |

* cited by examiner

*Primary Examiner* — Jamara Franklin
(74) *Attorney, Agent, or Firm* — KPPB LLP

(57) ABSTRACT

Systems and methods for implementing and utilizing a tamper resistant 3D magnetic stripe reader integrated circuit in accordance with embodiments of the invention are disclosed. In one embodiment, a three-dimensional magnetic stripe reader integrated circuit (IC) includes at least one magnetic read sensor configured to generate a signal representative of information on a magnetic stripe, a decoding circuit configured to receive the signal from the at least one magnetic read sensor and generate a data signal, an encryption circuit configured to receive the data signal from the decoding circuit and generate an encrypted signal, a substrate layer, where the at least one magnetic read sensor, decoding circuit, and encryption circuit are mounted to the substrate layer, and IC packaging at least partially enclosing the at least one magnetic read sensor.

16 Claims, 4 Drawing Sheets

TAMPER RESISTANT 3D MAGNETIC STRIPE READER INTEGRATED CIRCUIT

CROSS-REFERENCE TO RELATED APPLICATIONS

The current application claims priority to U.S. Application No. 61/780,909, filed Mar. 13, 2013, the disclosure of which is incorporated herein by reference.

FIELD OF THE INVENTION

The present invention relates to devices that read magnetic stripes and more specifically to a secure three-dimensional integrated circuit containing components of a magnetic stripe reader.

BACKGROUND OF THE INVENTION

Magnetic stripe-bearing documents, for example credit cards, banking cards, and debit cards, are a type of data-bearing instrument commonly used in a variety of transactions. Account data is recorded on a stripe of magnetic material on the card. The data may include the issuing bank ID, account number, account holder's name, and/or security codes for the account.

When a magnetic stripe card is presented for payment, the magnetic stripe is read by a point-of-sale (POS) terminal, which extracts the data, sends it for validation to the bank, and waits for acceptance or rejection of the payment. If the transaction is accepted, the POS terminal prints a voucher (or obtains an electronic signature) and prints a receipt, and the merchant sees that the voucher is signed with the appropriate signature and provides the receipt with the purchased goods. The POS terminal can be a card reader or a device incorporating a card reader. A card reader typically includes at least a magnetic read head (or sensor) and supporting circuitry, such as a decoder and an encryption circuit.

SUMMARY OF THE INVENTION

Systems and methods for implementing and utilizing a tamper resistant 3D magnetic stripe reader integrated circuit in accordance with embodiments of the invention are disclosed. In one embodiment, a three-dimensional magnetic stripe reader integrated circuit (IC) includes at least one magnetic read sensor configured to generate a signal representative of information on a magnetic stripe, a decoding circuit configured to receive the signal from the at least one magnetic read sensor and generate a data signal, an encryption circuit configured to receive the data signal from the decoding circuit and generate an encrypted signal, a substrate layer, where the at least one magnetic read sensor, decoding circuit, and encryption circuit are mounted to the substrate layer, and IC packaging at least partially enclosing the at least one magnetic read sensor.

In a further embodiment, the at least one magnetic read sensor includes three magnetic read sensors positioned to read from three tracks of data on a magnetic stripe.

In another embodiment, the at least one magnetic read sensor includes at least one non-contact magnetic read sensor.

In a still further embodiment, the at least one magnetic read sensor has output electrical connections on the same side of the sensor as the sensing portion of the sensor.

In still another embodiment, the output electrical connections on one side of the at least one magnetic read sensor are electrically connected to connections on a second side of the at least one magnetic read sensor using through silicon vias.

In a yet further embodiment, the output electrical connections on one side of the at least one magnetic read sensor are electrically connected to connections on a second side of the at least one magnetic read sensor using edge routing.

In yet another embodiment, the sensing portion of the least one magnetic read sensor is exposed from the IC packaging.

In a further embodiment again, the sensing portion of the least one magnetic read sensor is completely contained within the IC packaging.

Another embodiment again also includes a fingerprinting module configured to generate a signal representative of an intrinsic magnetic characteristic of the magnetic stripe.

A further additional embodiment also includes a tamper protection perimeter enclosing one or more components of the integrated circuit.

In another additional embodiment, the tamper protection perimeter is integral with the IC packaging.

In a still yet further embodiment, the at least one magnetic read sensor is contained at least partially within the IC packaging and the tamper protection perimeter.

In still yet another embodiment, the tamper protection perimeter includes at least one sensor configured to detect a breach of the tamper protection perimeter.

A still further embodiment again also includes a security module configured to erase encryption keys when a breach is detected.

In still another embodiment again, the encryption circuit includes a secure microcontroller configured with Triple Data Encryption Standard.

In a still further additional embodiment, the at least one magnetic read sensor and the encryption circuit are mounted to opposite sides of the substrate layer.

In still another additional embodiment, a method for reading and securing data from a magnetic stripe using a three-dimensional magnetic stripe reader integrated circuit includes detecting magnetic characteristics of a magnetic stripe using at least one magnetic read sensor, extracting digital data from the detected magnetic characteristics, encrypting the extracted digital data, and outputting the encrypted data when tampering has not been detected.

DETAILED DISCLOSURE OF THE INVENTION

Figure 1:
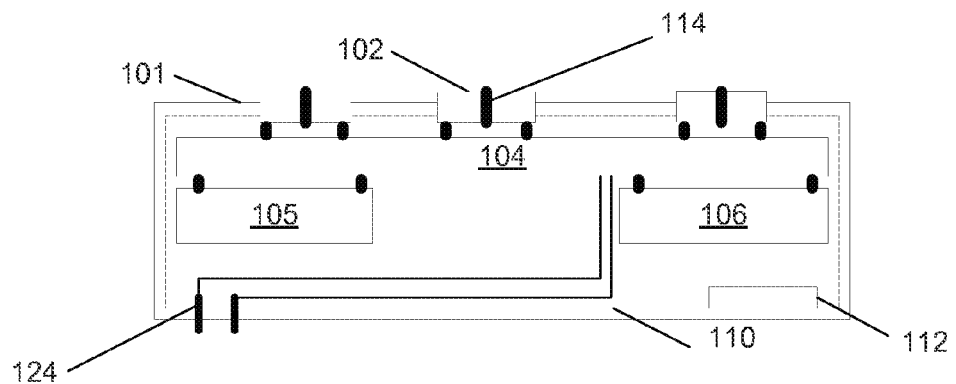
FIG. 1 is a conceptual illustration of a magnetic stripe reader integrated circuit architecture including decoder and encryption components and using through-silicon via connections in accordance with embodiments of the invention.

Turning now to the drawings, tamper resistant three dimensional magnetic stripe reader integrated circuits in accordance with embodiments of the invention are illustrated. Reader integrated circuits (ICs) may include tamper protection measures, encryption circuitry, and magnetic fingerprinting capabilities for secure reading of magnetic stripes.

Many secure magnetic stripe readers include components such as a magnetic reading head connected to a decoder circuit connected to an encryption engine. Some secure magnetic stripe readers also include a magnetic fingerprint circuit that detects unique magnetic characteristics of each particular magnetic stripe. In several embodiments of the invention, secure magnetic stripe readers include non-contact magnetic read sensors with an extended range of up to 20 nm, enabling the components to be packaged together with the sensors able to read a magnetic stripe. With an extended read range, non-contact sensors may be placed inside of packaging circuit materials and/or other protective barriers and still be able to read a magnetic stripe on the other side of the barrier. In some embodiments of the invention, CMOS sensors are used as extended read range, non-contact sensors, where the CMOS sensors have electrical connections on the same side as the reading surface and interconnections such as through-silicon vias or edge routing are used to provide electrical connections on the other side of the sensor or sensor die. In many embodiments of the invention, all circuitry of a secure magnetic stripe reader is integrated into a single, secure integrated circuit (IC) package that is tamper resistant. In several embodiments of the invention, a magnetic read head (or sensor) is packaged together with supporting circuitry that can include a decoder, an encryption module, and/or a magnetic fingerprinting module in a 3D integrated circuit. Active or passive tamper resistance mechanisms can be implemented on the package that detect and/or react to tampering. In this way, all of the electronics in the secure magnetic stripe reader utilized to read, decode and encrypt information extracted from a magnetic stripe can be contained within a single tamper resistant housing that can be mounted in a magnetic card reader device. Secure magnetic stripe readers including secure 3D integrated circuits and non-contacting magnetic read sensors in accordance with embodiments of the invention are discussed further below.

3D Packaging and 3D Integrated Circuit

Three-dimensional (3D) packaging stacks separate chips into a single package, where the chips communicate using off-chip signaling, behaving as if they were mounted to a normal circuit board. A three-dimensional integrated circuit (3D IC) is a chip in which two or more layers of active electronic components are integrated both vertically and/or horizontally into a single circuit where components communicate using on-chip signaling. Both techniques typically occupy less space and/or offer shorter connectivity between components over a conventional two-dimensional layout. In many embodiments, components of a magnetic card reading circuit including (but not limited to) magnetic sensors, a decoder, an encryption module, a fingerprinting module, and/or a security module are combined into a 3D reader integrated circuit. In further embodiments, the 3D reader IC package is protected with tamper resistant measures that are discussed further below.

Various techniques can be used to interconnect the dies of the component chips in a 3D package. Interconnects may pass through one die layer to connect to another layer without making any connections to the first layer.

Through-silicon via (TSV) is a technique for creating vertical connections through the dies of the chips. The vias (vertical interconnect access) are short, vertical electrical connections that pass through a small opening in one die (silicon wafer) to establish an electrical connection to the other side of the die. TSV can provide shorter interconnect paths and higher interconnect densities than wire bonding and flip chip stacking.

Connections can also be made along the edges of stacked dies. Sometimes, an extra interposer layer may be needed to route connections between dies. Without the need to drill or mold holes through the silicon, edge routing can be lower cost than TSV. Various embodiments of the invention may use different techniques, including TSV and edge routing, to create connections to and between components.

Chip Architecture

In many embodiments of the invention, a reader IC includes magnetic sensors and components to decode, encrypt the magnetic data stored on a magnetic stripe and/or obtain a magnetic fingerprint of the magnetic material forming the magnetic stripe. The components may further be packaged as a 3D integrated circuit. A reader IC in which magnetic stripe reading components are packaged together in a 3D IC in accordance with embodiments of the invention is illustrated in FIG. 1. Most components of the reader IC 100 are contained entirely within the package 101. The sensing portions of magnetic read sensors 102 are exposed from the package 101 to read magnetic stripes. The sensors 102 are connected to a decoder 105 that receives signals output from the sensors 102 and converts them to a signal (e.g., a digital signal) that can be used by the other components in the reader IC. A magnetic sensor, such as a Hall effect sensor, typically outputs an analog signal indicative of a magnetic field. Other types of sensors, such as extended range CMOS sensors, can be utilized in various embodiments of the invention. A decoder receives the signal and converts the information into digital data that is then sent to an encryption module 106. The encryption module 106 encrypts the data before it is sent out of the chip.

Figure 2:
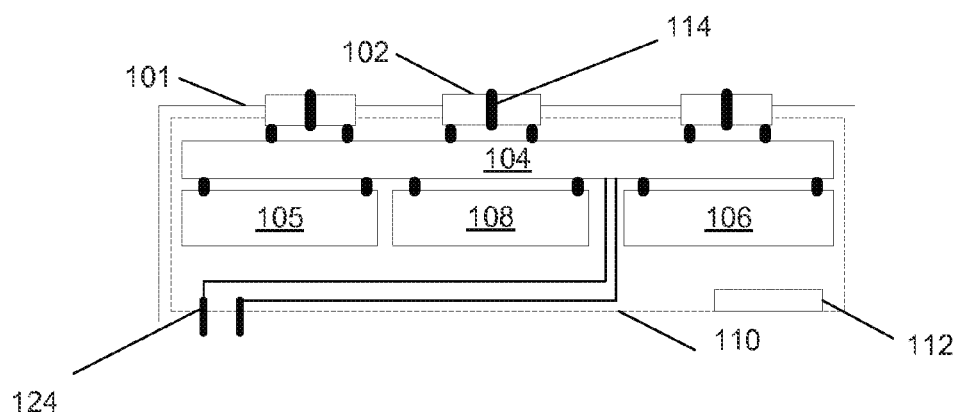
FIG. 2 is a conceptual illustration of a magnetic stripe reader integrated circuit architecture further including a magnetic fingerprinting component in accordance with embodiments of the invention.

In several embodiments of the invention, a reader IC also includes a fingerprinting module. A reader IC that includes a fingerprinting module in accordance with many embodiments of the invention is illustrated in FIG. 2. The reader IC is similar to the reader IC shown in FIG. 1 with the addition of a fingerprinting module 108. The fingerprinting module can extract a magnetic fingerprint from the signal from the magnetic sensor(s). The fingerprinting module may be connected directly to the magnetic sensor(s) or to another component, such as a decoder, that is connected to the magnetic sensor(s) and/or an encryption module that encrypts the magnetic fingerprint.

In many embodiments of the invention, a tamper protection perimeter 110, as illustrated in embodiments shown in FIGS. 1 and 2, encloses many of the components of the reader IC. The tamper protection perimeter 110 may be a physical or conceptual barrier that cannot be breached without being detected using one or more detection techniques. The use of a tamper protection perimeter in conjunction with a security module to detect tampering of the reader IC is discussed further below. The perimeter 110 may employ conductors, sensors, or other mechanisms for detecting a breach.

In several embodiments of the invention, the reader IC includes a security module 112 associated with the tamper protection perimeter 110. The connections between the security module 112 and other components in the reader circuit typically depend upon the requirements of specific applications. In several embodiments of the invention, security module 112 may be configured to respond to tampering by erasing encryption keys and/or other sensitive information stored in the reader IC and would be connected to encryption module 106 and/or other memory components in the reader IC where sensitive information is stored.

In various embodiments of the invention, security module 112 may be configured to detect intrusions to tamper protection perimeter 110. Alternatively, security module 112 may be configured to receive information from sensors associated with tamper protection perimeter 110 that indicate a breach of the perimeter. The security module 112 can be configured for various responses to a breach, including providing an indication of a breach and/or wiping cryptographic data from the reader IC. Techniques for detecting intrusions to a tamper protection perimeter and taking responses to intrusions is discussed further below.

As discussed further above, the components in a reader IC may be electrically connected in a variety of ways. Referring again to FIG. 1, one of several techniques for connecting components is illustrated. In several embodiments of the invention, a reader IC includes magnetic sensors that have output electrical connections on the same side of the sensor as the reading surface (referred to as the top side). The one or more magnetic sensors 102 have TSV vias 114 that connect to these output connections and pass through the silicon of the sensor die to connect to electrical connections their under sides. The electrical connections on the under side of each sensor are connected to a substrate layer 104 such as by surface mounting the magnetic sensors 102 to the top side of substrate 104. Decoder 105 and encryption module 106 are flipped and surface mounted to the under side of substrate 104.

Figure 3:
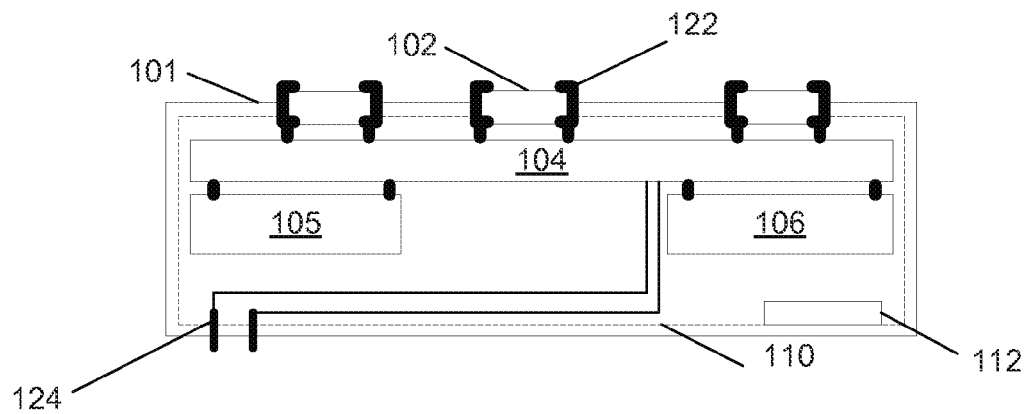
FIG. 3 is a conceptual illustration of a magnetic stripe reader integrated circuit architecture with edge routed connections in accordance with embodiments of the invention.

In other embodiments of the invention, edge routing may be used to provide electrical connections on the undersides of magnetic sensors. A reader IC with magnetic sensors connected using edge routing in accordance with embodiments of the invention is illustrated in FIG. 3. In the reader IC, one or more magnetic sensors 102 have edge connectors 122 that connect output connections from the magnetic sensors to electrical connections on their under sides. The electrical connections on the under side of each sensor are connected to a substrate layer 104 such as by surface mounting the magnetic sensors 102 to the top side of substrate 104. One skilled in the art will recognize that interconnections between various components may utilize TSV vias, edge routing, and/or other types of electrical connections in accordance with embodiments of the invention. Moreover, different types of connections may be used for various connections within the reader IC.

The reader ICs illustrated in FIGS. 1-4 include one or more output connectors 124 that provide the data that is output from the reader ICs. Reading data from a magnetic stripe and processing data using the reader IC are discussed further below.

Magnetic Sensor

A reader IC in accordance with embodiments of the invention typically includes at least one magnetic read sensor 102. Commonly used magnetic stripe cards, such as credit cards, debit cards, and bank cards, encode information on three tracks of data. Thus, many magnetic read heads contain at least three sensors, one for each track of data. In many embodiments of the invention, three magnetic read sensors are mounted in the 3D package such that they can be aligned with the tracks on a magnetic stripe to be read. In several embodiments, a CMOS die with three magnetic read sensors is mounted in the 3D package. Other embodiments of the invention may include different numbers of magnetic read sensors, so long as connectivity and supporting circuitry are provided to make use of the sensors.

In many embodiments of the invention, a secure magnetic stripe reader IC includes one or more non-contact magnetic read sensors, enabling the components to be packaged together in such a way that the sensors are less exposed. Non-contact magnetic read sensors have an extended read range. Several non-contact magnetic read sensors in accordance with embodiments of the invention have a range of up to 20 nm. Sensors that can be utilized in accordance with embodiments of the invention include solid state magnetic sensors manufactured using CMOS (complementary metal-oxide-semiconductor) technology, referred to here as CMOS sensors. The sensors can operate to read data from a magnetic stripe through any of a variety of detection techniques including (but not limited to) anisotropic magnetoresistance (AMR), geometrical magnetoresistance (GMR), and micro Hall effect.

Figure 4:
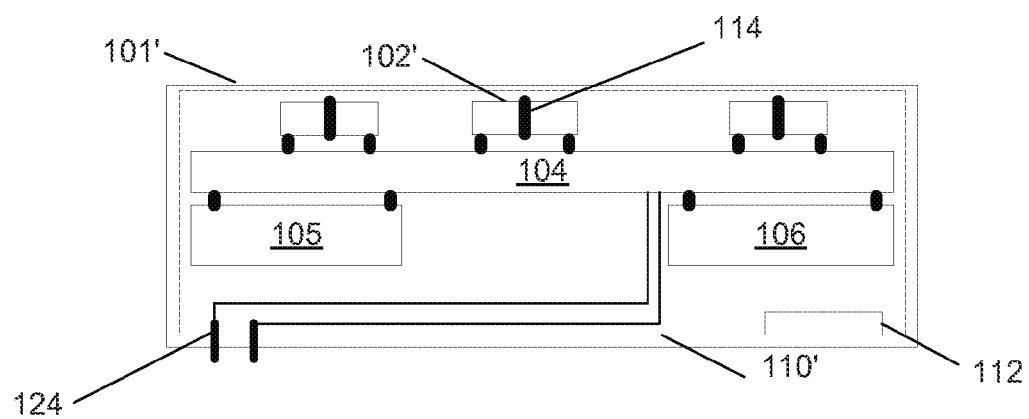
FIG. 4 is a conceptual illustration of a magnetic stripe reader integrated circuit architecture where magnetic sensors are entirely contained within the IC package in accordance with embodiments of the invention.

A reader IC with non-contact magnetic read sensors in accordance with embodiments of the invention is illustrated in FIG. 4. The sensors 102' are contained entirely within the package 101' as well as within tamper protection perimeter 110'.

In many embodiments of the invention, a reader IC includes a decoder 105. The decoder may include an analog-to-digital converter that converts the analog signal from the magnetic reader sensor(s) 102 into a digital signal that can be processed by the other components in the reader IC.

Encryption Module

An encryption module provides encryption for data that is read from a magnetic stripe by the magnetic sensor(s) before the data is output from the reader IC. In many embodiments of the invention, data extracted from a magnetic stripe can include an account number, name, and expiration date. In some embodiments of the invention, a portion of the data may be made available in plain text from the magnetic card reader for local verification by a user of the terminal to check that it matches the card presented. In several embodiments, the encryption module encrypts a magnetic fingerprint generated by a fingerprinting module before it is sent out of the reader IC. The encryption in a reader IC in accordance with embodiments of the invention can be implemented through the use of a secure micro controller (MCU). An MCU used as an encryption module 106 in accordance with embodiments of the invention is illustrated in FIG. 1.

Various types of encryption schemes may be implemented. In a number of embodiments, the encryption module uses a public key/private key encryption scheme. In several embodiments, an encryption scheme complying with a standard commonly used by the financial industry such as Triple Data Encryption Standard (Triple DES) developed by the International Business Machines Corporation of Armonk, N.Y. can be used. In other embodiments, other encryption techniques can be used. The encryption module typically contains, or is connected to, memory on which encryption keys or other cryptographic data is stored.

Encryption schemes and techniques utilized by embodiments of the invention may be designed or chosen to be Secure Reading & Exchange of Data (SRED) compliant. SRED is a set of evaluation requirements published by the Payment Card Industry Security Standards Council of Wakefield, Mass. that facilitates testing of the secure reading and encryption of cardholder data at the point of entry, such as from a terminal with a magnetic card reader. The data typically remains encrypted and transmitted from a terminal to another trusted device or server where it can be decrypted securely.

Fingerprinting Module

The authenticity of certain documents containing magnetic stripes can be verified by comparing a magnetic fingerprint that is read from the magnetic stripe to a copy of the magnetic fingerprint previously stored for that magnetic stripe. In several embodiments, a fingerprinting module 108 in the reader IC is configured to extract information related to an intrinsic magnetic characteristic of a magnetic stripe, which can be thought of as a magnetic fingerprint that can be utilized to uniquely identify the card or document containing the stripe. In some embodiments, the signal is transferred from a magnetic read sensor 102 that also provides a signal to the decoder 105. In other embodiments, the signal is received by the fingerprinting module from the decoder 105. In even further embodiments, a separate sensor may be used exclusively by the fingerprinting module. A reader IC in accordance with embodiments of the invention that includes a separate fingerprinting module is illustrated in FIG. 2. The fingerprinting module 108 is flipped and mounted to the underside of substrate 104. In other embodiments, the fingerprinting module is integrated into the decoder. For example, the decoder 105 in the reader IC illustrated in FIG. 1 can be a combined decoder and fingerprinting module.

The intrinsic magnetic characteristic can be derived from a unique remnant noise characteristic of the card that is related to the magnetic material that forms the magnetic stripe (i.e. is not a signal that is written to the magnetic stripe) and can be repeatedly read. Systems and methods for sensing the noise characteristic and generating a magnetic fingerprint include those disclosed in U.S. Pat. No. 7,478,751 entitled "Method and Apparatus for Authenticating a Magnetic Fingerprint Signal Using a Filter Capable of Isolating a Remnant Noise Related Signal Component", U.S. Pat. No. 7,377,433 entitled "Method and Apparatus for Authenticating a Magnetic Fingerprint Signal Using Compressive Amplification", and U.S. Pat. No. 7,210,627 entitled Method and Apparatus for Authenticating a Magnetic Fingerprint Signal Using an Adaptive Analog to Digital Converter", which are hereby incorporated by reference in their entirety. The magnetic fingerprint can be transmitted to a server or other device that stores a copy of the magnetic fingerprint for comparison.

As discussed above, an encryption module can be used to encrypt data before it is transmitted out of the reader IC. The encryption module can receive and encrypt the magnetic fingerprint. Encryption provides greater assurance that the magnetic fingerprint accurately represents the read magnetic stripe when the encrypted magnetic fingerprint is provided to a server to authenticate the magnetic stripe card.

Tamper Resistant Packaging

An advantage of containing multiple chips in a 3D package is that physical security measures can be implemented over the entire package, which may not be available or practical over sets of chips packaged separately. When chips are not integrated into a single package, the pins on the chips or conductors connecting the chips are susceptible to being tapped. Signals can be intercepted or the operation of the chips otherwise tampered with.

In many embodiments of the invention, tamper resistant measures are utilized to enhance security and prevent physical tampering with the magnetic stripe reader 3D integrated circuit. Various levels of security may be implemented that may include features such as making efforts at tampering evident to viewers or detecting tampering. One security standard is the Federal Information Processing Standard Publication 140-2 (FIPS 140-2), issued by the National Institute of Standards and Technology of Gaithersburg, Md., that is used to accredit cryptographic modules. FIPS 140-2 defines four levels of security. Level specifies basic requirements such as the use of at least one approved algorithm or approved security function. Level 2 requires physical security features that show evidence of tampering, such as tamper-evident coatings or seals that must be broken to attain physical access to cryptographic data within the module. Level 3 includes such physical security mechanisms that have a high probability of detecting tampering and responding by zeroing all plaintext cryptographic data. Level 4 adds protections from environmental conditions or fluctuations in voltage and temperature that may compromise the module.

Various techniques for detecting and responding to tampering of an integrated circuit package can be utilized in accordance with embodiments of the invention including, but not limited to, those disclosed in U.S. Pat. No. 4,860,351 entitled "Tamper-resistant Packaging for Protection of Information Stored in Electronic Circuitry" to Weingart and U.S. Pat. No. 5,369,299 entitled "Tamper Resistant Integrated Circuit Structure" to Byrne, the disclosures of which are hereby incorporated by reference in their entirety.

Tamper responsive features may include erasing at least one encryption key stored on the reader IC (such as in the encryption module or storage memory associated with the encryption module) and/or erasing all cryptographic data on the reader IC.

Reading a Magnetic Stripe Using a Reader IC

Figure 5:
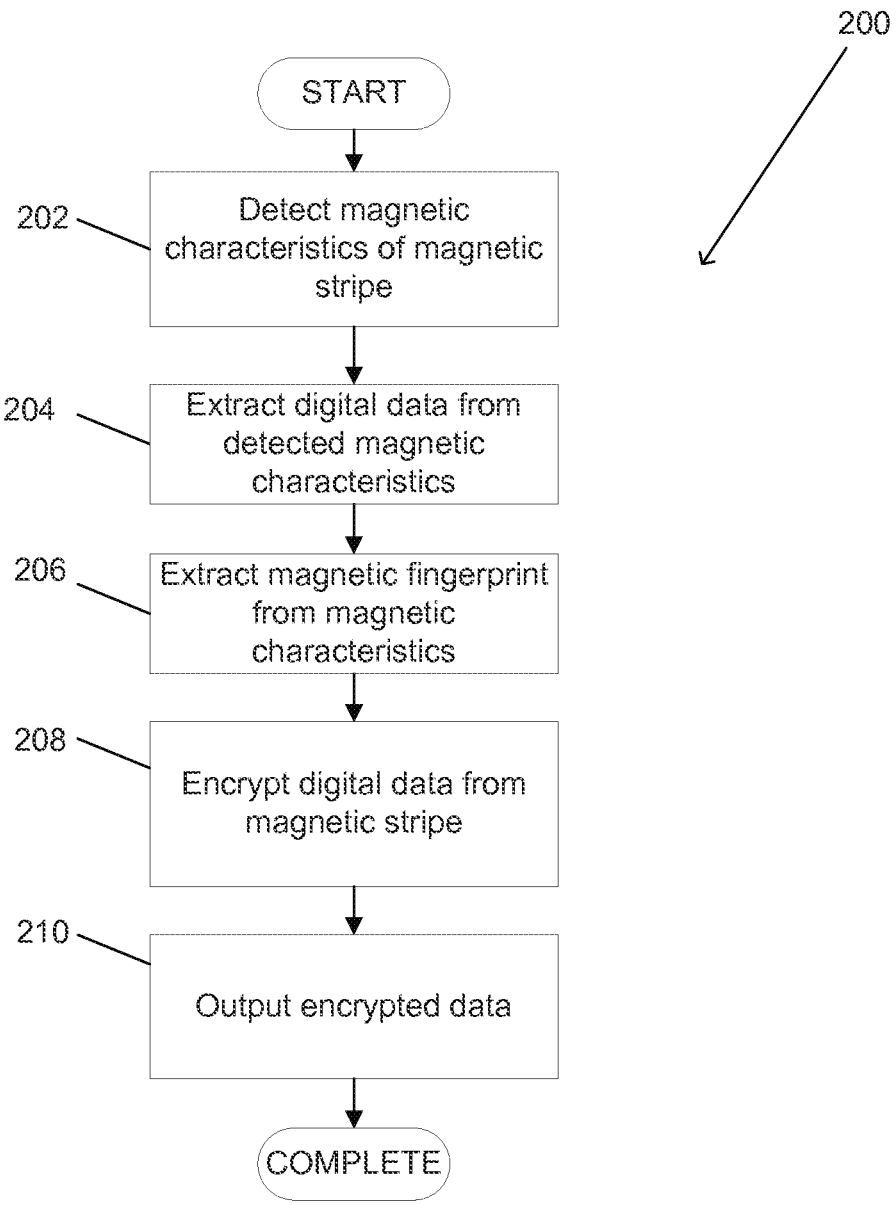
FIG. 5 illustrates a process for reading and securing magnetic stripe data using a reader integrated circuit in accordance with embodiments of the invention.

In many embodiments of the invention, a reader IC can be used to read and secure data that is stored on a magnetic stripe. A process 200 for reading and securing data from a reader IC in accordance with embodiments of the invention is illustrated in FIG. 5. When a magnetic stripe on a magnetic stripe bearing card or document is brought into proximity of the magnetic read sensor(s) (e.g., "swiped"), the magnetic characteristics of the stripe are detected 202 by the sensor(s). The digital data stored on the stripe are extracted 204 from the magnetic characteristics and converted into digital format using a decoder. In some embodiments of the invention, a magnetic fingerprint is also extracted 206 from the magnetic characteristics. The digital data is encrypted 208 using an encryption module and an encryption key. In other embodiments, the magnetic fingerprint is also encrypted using an encryption module and an encryption key. The encrypted data is output 210 from the reader IC. In some embodiments of the invention, the data is only output if tampering has not been detected. If tampering is detected on the reader IC, certain functions such as outputting data may be disabled and/or encryption keys or other cryptographic data may be erased from storage.

Figure 6:
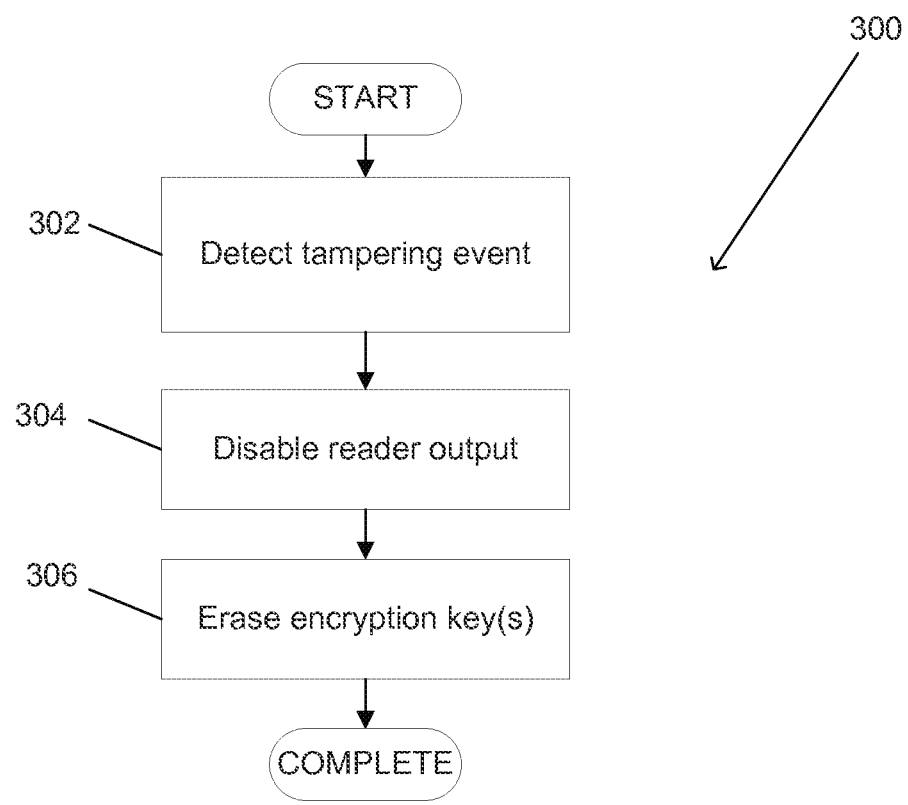
FIG. 6 illustrates a process for responding to tampering on a reader integrated circuit in accordance with embodiments of the invention.

In several embodiments of the invention, certain actions are taken upon the detection of tampering. The actions may be taken by or coordinated by a security module or other processor within the reader IC. A 300 process for responding to tampering on a reader IC in accordance with embodiments of the invention is illustrated in FIG. 6. A tampering event is detected 302, such as an intrusion into a tamper protection perimeter. The reader IC output is disabled 304 so that sensitive data cannot be read. One or more encryption keys are erased 306 from memory on which it is stored, such as any memory within the encryption module.

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

What is claimed is:

1. A three-dimensional magnetic stripe reader integrated circuit (IC), comprising:
   at least one magnetic read sensor configured to generate a signal representative of information on a magnetic stripe;
   a decoding circuit configured to receive the signal from the at least one magnetic read sensor and generate a data signal;
   an encryption circuit configured to receive the data signal from the decoding circuit and generate an encrypted signal;
   a substrate layer, wherein the at least one magnetic read sensor, decoding circuit, and encryption circuit are mounted to the substrate layer; and
   IC packaging at least partially enclosing the at least one magnetic read sensor.

2. The three-dimensional magnetic stripe reader integrated circuit of claim 1 wherein the at least one magnetic read sensor comprises three magnetic read sensors positioned to read from three tracks of data on a magnetic stripe.

3. The three-dimensional magnetic stripe reader integrated circuit of claim 1 wherein the at least one magnetic read sensor comprises at least one non-contact magnetic read sensor.

4. The three-dimensional magnetic stripe reader integrated circuit of claim 1 wherein the at least one magnetic read sensor has output electrical connections on the same side of the sensor as the sensing portion of the sensor.

5. The three-dimensional magnetic stripe reader integrated circuit of claim 4 wherein the output electrical connections on one side of the at least one magnetic read sensor are electrically connected to connections on a second side of the at least one magnetic read sensor using through silicon vias.

6. The three-dimensional magnetic stripe reader integrated circuit of claim 4 wherein the output electrical connections on one side of the at least one magnetic read sensor are electrically connected to connections on a second side of the at least one magnetic read sensor using edge routing.

7. The three-dimensional magnetic stripe reader integrated circuit of claim 1 wherein the sensing portion of the least one magnetic read sensor is exposed from the IC packaging.

8. The three three-dimensional magnetic stripe reader integrated circuit of claim 1 wherein the sensing portion of the least one magnetic read sensor is completely contained within the IC packaging.

9. The three-dimensional magnetic stripe reader integrated circuit of claim 1 further comprising a fingerprinting module configured to generate a signal representative of an intrinsic magnetic characteristic of the magnetic stripe.

10. The three-dimensional magnetic stripe reader integrated circuit of claim 1 further comprising a tamper protection perimeter enclosing one or more components of the integrated circuit.

11. The three-dimensional magnetic stripe reader integrated circuit of claim 10 wherein the tamper protection perimeter is integral with the IC packaging.

12. The three-dimensional magnetic stripe reader integrated circuit of claim 10 wherein the at least one magnetic read sensor is contained at least partially within the IC packaging and the tamper protection perimeter.

13. The three-dimensional magnetic stripe reader integrated circuit of claim 10 wherein the tamper protection perimeter comprises at least one sensor configured to detect a breach of the tamper protection perimeter.

14. The three-dimensional magnetic stripe reader integrated circuit of claim 13 wherein the at least one magnetic read sensor and the encryption circuit are mounted to opposite sides of the substrate layer.

15. The three-dimensional magnetic stripe reader integrated circuit of claim 1 further comprising a security module configured to erase encryption keys when a breach is detected.

16. The three-dimensional magnetic stripe reader integrated circuit of claim 1 wherein the encryption circuit comprises a secure microcontroller configured with Triple Data Encryption Standard.

* * * * *